CONTROL CIRCUIT FOR COLOR TELEVISION DISPLAY TUBES

Filed Dec. 22, 1953 2 Sheets-Sheet 1

INVENTOR.
JAMES D. GOW
BY Lippincott + Smith
ATTORNEYS

CONTROL CIRCUIT FOR COLOR TELEVISION DISPLAY TUBES

Filed Dec. 22, 1953 2 Sheets-Sheet 2

INVENTOR.
JAMES D. GOW
BY
Lippincott & Smith
ATTORNEYS

United States Patent Office 2,721,293

Patented Oct. 18, 1955

2,721,293

CONTROL CIRCUIT FOR COLOR TELEVISION DISPLAY TUBES

James D. Gow, Berkeley, Calif., assignor to Chromatic Television Laboratories, Inc., New York, N. Y., a corporation of California Application December 22, 1953, Serial No. 399,775

6 Claims. (Cl. 315—21)

This invention relates to apparatus for the display of television images in natural color. Specifically, it relates to apparatus for use in television systems wherein the information relating to the display of a plurality of component colors, additive to produce white, is transmitted either simultaneously or in "dot-sequential" form; wherein the display is accomplished in the screen of a cathode-ray tube, the viewing surface whereof comprises a multiplicity of very narrow strips of phosphors, emissive, respectively, on electron impact, of light of the component colors chosen and wherein a selection of which color shall be displayed by the electron beam is accomplished in the region immediately adjacent to the viewing surface by micro-deflection of the beam. In such tubes a color-control grid is mounted in a plane generally parallel to the viewing surface or display screen. This grid is comprised of two interleaved sets of elongated linear conductors, mutually insulated from each other. A deflection voltage is applied between the electrodes of the two sets and the electron beam which traces the image, entering between any pair of conductors, will be deflected in the direction of the more positive electrode to a degree depending upon the magnitude of the deflecting voltage.

In order to insure that a given deflecting voltage applied between the two sets of electrodes will result in a display of the same color at whatever point of the grid-screen structure the beam may fall upon, phosphors emissive of one color are electro-optically centered behind each of the electrodes of one set and those of another color are similarly centered behind each of the electrodes of the other set. In the preferred system, wherein three colors are displayed, a strip of phosphor emissive of the third color is deposited upon the screen between each pair of strips emissive of the other two. When no deflecting potential is applied between the two sets of electrodes the beam, in entering the interspace between any pair thereof, will strike a strip emissive of light of the third color. When a deflecting potential is applied, the beam entering on either side of a relatively positive electrode, will strike a strip centered beneath it. When the electrode under consideration swings negative, the beam will be deflected away from it, to one side or the other, depending upon which side it enters, and will strike the strip under the adjacent deflecting electrode on the side at which it enters and thereby excite the third color.

A number of variations of the system of microdeflection thus described have been proposed by various inventors. In general the proponents have provided that the deflecting voltage be applied between the deflecting electrodes in steps, applying it to the electrodes in one direction for a certain period, dropping it to zero for an equal interval, applying it in the opposite direction for a third equal interval and then reversing it again to start a new cycle of operation.

When the system of transmitting the color information is of either the line- or field-sequential type the color switching can be accomplished during blanking intervals and the fact that the beam, in returning to its original position, must retraverse the intermediate strip is of no moment. Where the transmission of color information is in accordance with a dot-sequential system, or when information as to all colors is transmitted simultaneously, as in the NTSC system now proposed for standardization, the problem is different. In order to give the effect of continuous natural color with a simultaneous system, using a single gun display tube with microdeflection of the beam to accomplish the color switching, the signal must, in effect, be broken up into dots of the various colors of very short duration. With the NTSC (National Television System Committee) system, the color information is transmitted on a chrominance sub-carrier wave having a frequency of what will herein be referred to as 3.58 megacycles. The actual frequency of this chrominance subcarrier as proposed by NTSC is 3.579545±0.003 mc. but 3.58 mc. is a convenient reference value which will be used herein. The 3.58 megacycle frequency becomes the most practical and, in effect, the minimum frequency at which the color information can be displayed to give the full resolution of which the system is capable. This implies that dots of all three colors must be displayed within the .28 microsecond period of this frequency.

A practical tube of the general character described is disclosed in the United States patent to Ernest O. Lawrence, No. 2,669,675, issued February 16, 1954. In one particular tube under consideration a display screen approximately 14⅜ x 10⅝ inches is used, with a color control grid comprised of 6 mil wires, separated, on the average, by a little over 29 mils on centers. These wires are divided into two sets, as has been described. The phosphor strips used are emissive, respectively, of red, green, and blue light, with the red and blue emitting strips electro-optically centered under the wires of the two sets, so that when no deflecting potential is applied the scanning cathode-ray beam falls on the strip emissive of green light. In using this tube the spot produced by the scanning beam is confined to a single phosphor by an electron lens action; the display screen is given a conducting coating by depositing thereon a thin metallic film, such as a film of aluminum, and is made positive to the mean potential of the color control grid by an amount which is approximately three times that by which the grid is positive to the cathode of the electron gun of the tube. This focuses the electron beam entering between any pair of grid wires down from its original dimension, in the neighborhood of 23 to 24 mils, to a width of from 3–7 mils, depending upon various factors not immediately pertinent here. The potential required for complete deflection of the beam, to make it fall immediately behind the more positive wire, is in the neighborhood of 400 volts. The interelectrode capacity between the two sets of grid electrodes is about 1400 micro-microfarads.

The charge and discharge of such a capacity over three and a half million times per second, using stepped wave forms, would require the use of vacuum tubes capable of supplying power of the order of a kilowatt, if step wave forms were used, which is quite impractical in television equipment intended for household use.

In accordance with the present invention the stepped wave forms of the prior art are discarded entirely. An inductor, preferably in the form of the secondary coil of an air core transformer, is connected between the two sets of electrodes so as to form therewith the inductance of a circuit resonant to the frequency of the color cycle to be employed, preferably the frequency of the sub-carrier used to convey the color information. The inductor is coupled to a source of oscillations of this frequency. The inductor is designed for minimum loss; conveniently a transformer comprising coaxial solenoidal coils may be employed. The result is a relatively high Q circuit, exciting the color control grids by a substantially pure sine wave. As a result of the microdeflection of the scanning cathode-ray beam in accordance with the sine wave pattern, the beam traverses the central strip twice in each cycle, while the red and blue strips behind the grid conductors are excited once per cycle.

Signals representative of the red, green, and blue light components of the picture image are separated in the receiver and fed to individual gates in accordance with conventional current practice in the same manner as where a separate electron gun is employed for each component. Means are provided for gating these three signals in such manner that they are switched in succession to the single gun here employed in the intervals when the micro-deflection will cause the scanning spot to fall wholly on the appropriate color. Potentials of color switching frequency are applied in opposite phase to two of the gates, those which control the red and blue signals, in case these are the colors emitted by the phosphors effectively behind the control electrodes of the two sets. The same switching frequency is supplied to a frequency doubler, and the output of the doubler is applied to control the third gating means. The gating means are so biased that they will pass signals only during a portion of the positive half-cycles of the gating potentials applied thereto. These potentials may be applied as formed pulses, or they may be, effectively, merely the crests of sinusoidal waves. In any event the period during which the gates pass signals is only that portion of the color switching cycle wherein substantially the entire area of the scanning spot falls on the phosphor emissive of the color represented by the signal controlling the particular gate in question. The color cycle frequency and the double frequency are respectively so phased, therefore, that the scanning beam is planked or interrupted at epochs of the color switching cycle approximately 30° on each side of the voltage nodes of that cycle, or, more precisely, the relative phases are such that the gate-actuating peaks of the double frequency waves occur at the nodes of the fundamental frequency waves, are of such magnitude that the gate passes current for 60 electrical degrees of the color cycle frequency minus the time required for the scanning spot to move its own diameter in its sinusoidal path.

As should be evident from the above, among the objects of the invention are to provide a means whereby color television signals of the dot-sequential or simultaneous type may be utilized to display images in natural colors on a tube of the strip-phosphor type using a single gun and microdeflection to produce the respective colors; to provide means and methods of microdeflection requiring relatively small power to produce the color switching; to provide means whereby the images produced by a tube of the character described give full color saturation where such is required, undiluted by fortuitous signals of the wrong color caused by the scanning beam overlapping two color strips simultaneously; to provide a system of color switching whereby, with relatively simple and readily realizable apparatus, color images can be displayed by a single gun tube; to provide a means and method of producing natural color television images wherein no problems of registration as between the various component colors are involved; and to provide apparatus which, because of its simplicity, means of adjustment, and low power consumption is practical for home use and operation by unskilled personnel.

The practice of the invention will be more evident from the following description of certain specific embodiments thereof, taken in connection with the accompanying drawings wherein.

Figure 1:
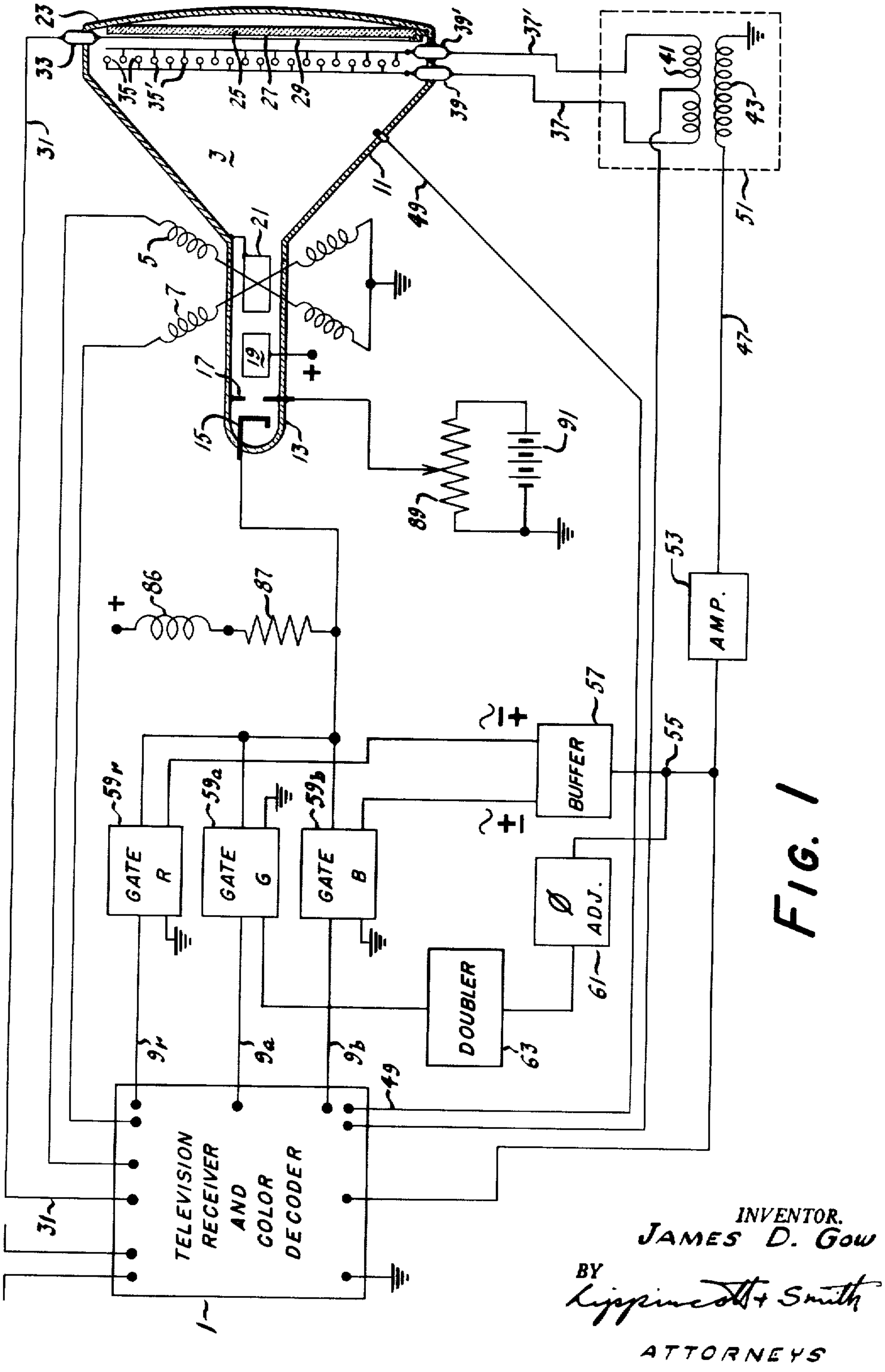
Fig. 1 is a circuit diagram, partly in block form and partly schematic, of a television receiver embodying the present invention.

Turning to the drawings, Fig. 1 is a diagram, largely in block form, illustrating the general plan of connection utilized in accordance with a preferred form of the invention. The drawing shows in block a color television receiver 1, including the usual equipment comprised in a black-and-white receiver plus the additional apparatus involved in decoding color signals transmitted in accordance with NTSC standards, by reference to which this invention will be described. The conventional equipment includes the usual radio frequency and video amplifiers, vertical (field) and horizontal (line) scanning generators, providing a nominal 60 cycle saw-tooth wave for scanning in the vertical dimension and a 15,750 cycle saw-tooth wave for scanning in the horizontal dimension, plus power equipment for supplying operating voltages to the cathode-ray tube designated generally by the reference character 3. The tube is provided in the present instance with a deflecting yoke including a vertical deflecting coil 5 and a horizontal deflecting coil 7. Normally the yoke would also include a focus coil, but in the interest of simplicity this is not shown. The color decoding equipment includes a generator for developing the 3.58 megacycle chrominance subcarrier frequency for use in demodulating these signals. It also includes the usual matrix for developing simultaneously, signals representative of the red, green, and blue components, which are fed to output leads $\mathbf{9_r}$, $\mathbf{9_g}$, and $\mathbf{9_b}$ respectively.

The tube 3 comprises the usual envelope 11, which may be either of metal or of glass; if of the latter, its inner surface is supplied with a conductive coating, as is well understood, but in the present case it may be assumed that the shell is of metal, with a glass neck 13 enclosing an electron gun of conventional type. The gun comprises an electron-emitting cathode 15, a control grid 17, and first and second anodes 19 and 21 respectively. The second anode is conductively connected to the shell 11. Since the gun structure may be identical with that employed in monochrome television display tubes, further description is believed unnecessary.

Sealed to the wide end of the conical shall 11 is a glass window 23. Immediately within the window there is mounted a target structure. This comprises a translucent or preferably transparent base 25. On the base 25 there is deposited a phosphor coating comprised of strips of three different phosphors, emissive, respectively, of light of the three components, red, green, and blue. In the tube chosen for specific description these strips have an average width of 15 mils, disposed on the display surface with their longer dimension extending horizontally. Preferably they are arranged in the order red, green, blue, green, red, etc., with a green strip between each pair of red and blue. In order to compensate for varying sensitivity of the beam to both the focusing fields and to the color deflection the strips may not be of uniform width throughout their length, the green strips being wider at their ends than in their central portions, but this is not necessary in order to make the tube operative. This feature is fully described and claimed in a copending United States patent application, Serial No. 399,753, filed December 17, 1953, by Ernest O. Lawrence and entitled "Display Surface for Color Television Tube." The strips closer to the edges of the screen may also be narrower than those nearer the center, as is described in United States patent applications, Serial No. 380,309, filed September 15, 1953 (now abandoned), and entitled "Display Surface for Color Television Tubes," and Serial No. 399,754, filed December 22, 1953, entitled "Color Television Tube Target Structure," also applications of Ernest O. Lawrence. Overlying the phosphor strips is a thin film 29, of aluminum or other conductive material which connects to a lead 31, brought out through the envelope of the tube through an insulating bushing 33.

Figure 2:
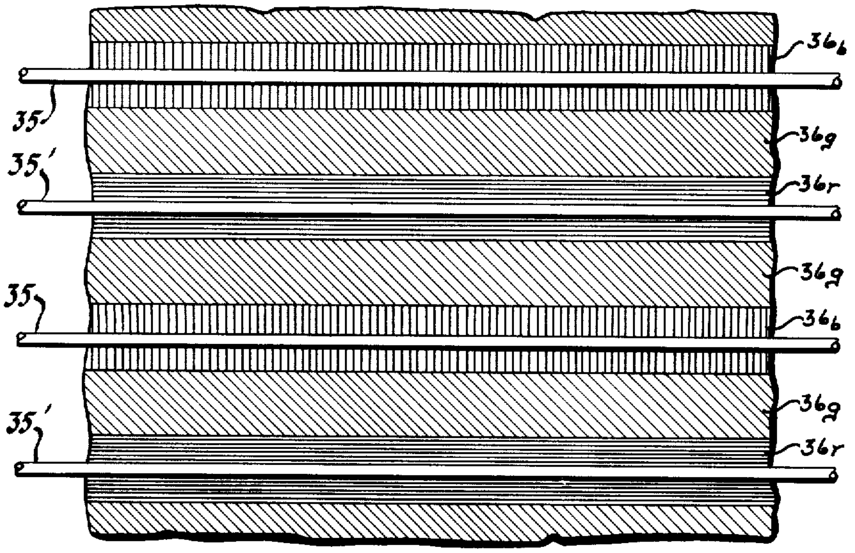
Fig. 2 is a diagram of a portion of the display screen of a tube adapted for use in the practice of the invention taken at substantially the center of the target area but without any intimation as to actual or precisely proportional dimension.

Positioned in front of the display screen as viewed from the electron gun is the color control grid, the distance between grid and screen being 450 mils in the tube described. The grid comprises two sets of tightly strung wires, disposed generally parallel to the phosphor strips. Various ways of constructing the color control grid are disclosed and claimed in Vale United States patent application Serial No. 252,664, filed October 23, 1951, and Zaphiropoulos United States Patent #2,683,833 granted July 13, 1954, from United States patent application Serial No. 307,435, filed September 2, 1952. Irrespective of which of these structures is actually used, alternate wires are electrically connected, adjacent wires being mutually insulated. The color control grid wires, therefore, form two mutually insulated sets. One set of grid wires, designated by the reference character 25, is positioned to be electro-optically centered in front of the blue strips $36_b$, while the other set of wires 35' is electro-optically centered in front of the red strips $36_r$. The green strips $36_g$ are disposed between each pair of red and blue strips. This arrangement is illustrated in Fig. 2, showing the disposition of the wires and strips at the center of the screen, where electro-optical and structural alinement coincide. At the edges of the screen structural centering no longer exists if the strips and phosphors are to be electro-optically alined as they must be if the device is to be operative to produce the picture in true colors. This is because, in the tube illustrated, the scanning beam is reduced in diameter by electron focusing so that it is small enough to be confined to a single phosphor at the proper epochs of its deflection. The focusing is accomplished by applying a potential difference between the grid and the coating 29 on the display screen which accelerates the electrons passing through the grid and deviates them from a straight line course, resulting in a smaller angle of incidence at the display screen than that at the grid. The necessary criteria for the relative positions of the phosphor strips with respect to the peripendicular dropped to the display screen from the grid wires are fully explained in the Lawrence United States patent application entitled, "Color Television Tube Target Structure," Serial No. 399,754, above identified. The two sets of grid wires, considered as a whole, together with the conducting film 29, constitute a multiplicity of electron lenses whose apertures are the spacings between the grid wires.

When the relative positions of grid electrodes and strips are such that an electron entering the center of any aperture and subjected to the focusing potential between grid and screen and in the absence of any color deflecting potential, impacts substantially the center of a strip emitting green light, that strip is said to be electro-optically centered behind the aperture. By like reasoning, the red and blue strips are electro-optically centered behind electrodes 35 and 35' respectively. It is to be noted that although the electrodes have been described as wires and it is convenient so to form them, they may also comprise narrow strips or tapes, mounted edge-on to the path of the beam as deflected in scanning the target area.

Conductors 37 and 37', connecting, respectively, to the grid electrodes 35 and 35', are brought out through the tube envelope through insulating bushings 39 and 39' and are connected to the terminals of an inductor 41 which forms the secondary of transformer having a primary coil 43. Coil 41 is center tapped and its midpoint is connected to a lead 45 which is supplied from the receiver 1 with a direct voltage of about 5000 volts positive with respect to the cathode 15. One end of the primary coil 43 is grounded; the other end is supplied through a lead 47 with a 3.58 chrominance subcarrier and deflecting frequency. Shell 11 connects to a lead 49 which is supplied from the receiver 1 with a "seeker" potential about 200 to 300 volts more positive with respect to the cathode than the average potential of the grid, for the purpose of collecting any secondary electrons emitted by the grid or the screen and preventing their falling back to the screen and contaminating the colors displayed and fogging of detail.

The inductance of the coil 41 is so chosen as to form, with the capacity between the two sets of electrodes 35 and 35', a circuit whose natural frequency is the 3.58 megacycles chrominance subcarrier frequency. In the tube described the inter-electrode capacity is about 1400 micromicrofarads. This requires an inductance of approximately 1.4 microhenrys. The type of transformer wherein this inductor is incorporated is not an essential feature of the invention since many variants of such structures are well-known in the art. It is convenient, however, to employ a simple air core transformer of the coaxial coil type. The two sets of electrodes of the grid should be balanced with respect to ground, and this can, of course, be done by supplying the inductor 41 directly from a push-pull circuit. Because of the relatively high biasing potential at which the grid is operated such an auto-transformer connection would, of course, require blocking condensers in the leads. In the case of the coaxial coil transformer the circuits are completely separated physically and the necessary insulation may be introduced between the coils without difficulty. The switching circuit may then be supplied through a single-ended amplifier, with the coil 43 grounded as shown, or connected to B+, whichever appears desirable from a purely structural standpoint.

In its preferred structure the circuit comprising the coil 41 and the grid electrodes can be given a Q in the neighborhood of 200. Under these circumstances a deflecting voltage of 325 volts R. M. S. may be supplied by about 20 watts from the oscillator, most of the power being expended in losses in the coil itself and the leads into the tube; the circulating current being of the order of 10 amperes. From this it will be clear that the coil should be mounted as close to the tube as possible; preferably it is enclosed in a shield, indicated by the dotted rectangle 49, which may be mounted directly on the tube. Since the object is to provide as high a voltage as possible, the impedance relation between the actuating circuit and the resonant circuit should be such as to produce maximum voltage transfer rather than maximum power transfer, making the source impedance as viewed from the transformer relatively low.

The voltage required for the switching operation is, of course, much greater than that required for the demodulation of the color signals. Lead 47 is therefore supplied from the 3.58 demodulating source through a power amplifier 53.

A lead 55, from the same source, connects to a buffer amplifier 57 which supplies the subcarrier frequency in opposite phases to gate $59_r$ and to gate $59_b$, which are connected respectively to the color circuit leads $9_r$ and $9_b$. Also connected to lead 55, through a phase adjuster 61, is a conventional frequency-doubler circuit 63. This supplies a gating frequency of 7.16 megacycles to gate $59_g$, connected to green color lead $9_g$.

Figure 3:
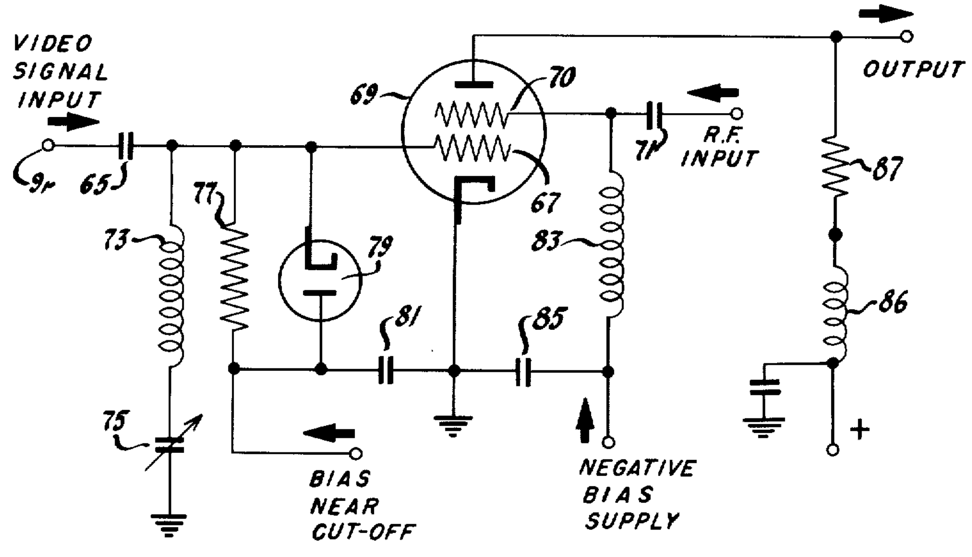
Fig. 3 is a schematic diagram of one form of gating circuit which may be employed therein.

Various forms of gating circuits may be employed in the gates. One which has proved satisfactory in practice is illustrated in Fig. 3. Since schematically the three gates are identical, the description of that controlling the red signal will do for all. As shown in this figure, the lead $9_r$ connects through a blocking condenser 65 to the control grid 67 of a tube 69. The screen grid 70 of this tube connects through a blocking condenser 71 to one output lead of the buffer amplifier 57. A trap circuit comprising an inductor 73 in series with a condenser 75, tuned to series resonance with the gating frequency of 3.58 megacycles, connects from the grid 67 to ground; in the green gate $59_g$ this trap is tuned to the double frequency. A grid resistor 77 connects to a suitable source to bias the tube nearly to cut-off, the bias being fixed by a clamp diode 79, and a by-pass condenser 81 connects from the biasing circuit to the grounded cathode of the tube. The screen grid 70 is also biased negatively through a radio-frequency choke coil 83, and in this case also the negative bias supply is connected to the grounded cathode through a by-pass condenser, designated as 85.

The red video input from the lead $9_r$ is positive for maximum luminance, and therefore maximum signal drives the plate of tube 69 negative. The plate connects in parallel with the plates of the other gates to the cathode 15 of the electron gun, as shown in Fig. 1. The plates are supplied from a source of about 200 volts positive to the grounded cathode through a load circuit comprising a peaking coil 86 and a series resistor 87. Brightness is controlled by varying the bias of the grid 17, which is adjustable through a potentiometer 89. For convenience the potentiometer is shown as connected across a battery 91, this battery symbolizing any suitable source of biasing potential which would normally be included in the television receiver 1.

It will be understood that in this showing the delay lines or other phasing instrumentalities normally included in color television receivers have been omitted for purposes of simplifying the drawings, since their use is well understood, and that the phase adjuster 61 may, in practice, be replaced by such a delay line if this is convenient from the manufacturing point of view. In the circuit as here described the gating pulses used are actually the positive peaks of the 3.58 and 7.16 megacycle sinusoidal waves. The biases of the grids 67 and 70 of the tube 69 can be adjusted relative to the cut-off of the tube so as to make the tube pass current during any desired portion of the positive cycle of the gating frequency. The gates are so adjusted by regulating these biases that maximum current is passed by gates $59_r$ and $59_b$ when the voltage between the electrodes 35 and 35' is substantially at its maximum peaks, making allowance, however, for the transit time of the electron beam between the cathode and the color grid. By taking more or less of the peaks of the switching frequency the epochs of the switching cycles during which the gates pass current can be accurately adjusted. The space current through the tube can be substantially cut off by either the grid 67 or the grid 70; as has been explained, grid 67 is biased nearly at the cut-off point. When the shield grid is negative, no current will be passed irrespective of the potential on the grid 67. Since it has a negative bias no current will flow during the negative half cycle nor will any flow until the positive half rises to some definite relationship with the negative bias; with most tubes the positive swing must at least equal and usually exceed the bias before appreciable current passes. It would, of course, be possible to shape the pulses resultant from the switching frequencies, and regulate their width by well known procedures; it is simpler and just as effective to use the sine waves directly.

If the single and double frequency gating voltages are properly phased the use of the sine wave pulses possesses the additional advantage that they pass through the cut-off value an equal number of electrical degrees on each side of the peak. If the amplification of the red, green, and blue channels is made inversely proportional to the efficiency of the phosphors employed for the screen, the dwell of the beam on each phosphor, integrated over the cycle of the fundamental switching frequency of 3.58 megacycles, must be equal. If a stepped wave form were used for both switching and gating, the ideal would be to have the dwell each phosphor 60 electrical degrees out of each half cycle. With sine wave deflection, considering the excursion of the scanning spot which is due to the color deflection as being that of its center, its dwell on the green emitting phosphor, between cut-off points, will be equal to the width of the phosphor strip minus the diameter of the spot, divided by its average velocity in traversing the strip laterally; its dwell on the red and blue phosphors should be twice this value. In so adjusting the beam, assuming that the phosphor strips are of equal width throughout their length, there are three factors which may be varied to produce equal illumination. These are the amplitude of the color deflection, the amplitude of the gating voltages, and the bias potentials. Because the beam crosses the green strip twice as often as its crosses either red or blue, and is, moreover, travelling most rapidly in its color-deflection cycle as it traverses the green strip, it is the dwell on the latter which becomes one limiting factor. Since the width of the spot varies with the angle of scanning deflection, a second limiting factor is the maximum width of the spot; this depends upon focus. If the beam is so focused that the spot has minimum width at the center of the screen, it will be overfocused at the edges and the spot will be widest at this point, while if the spot is made of minimum width at the edges of the screen it will be underfocused at the center and have its widest dimension there. Intermediate values can be chosen, so that maximum focusing is achieved between the center and the edges of the screen. Furthermore, as has been shown in the Lawrence application Serial No. 380,309 referred to above, the green strip may be wider at its ends than in the center. In any event the adjustment of the gating potential and cut-off values is made for the limiting conditions, but color sweep, gating amplitude and gating bias are interdependent. Under ideal conditions, with the color signal amplitudes inversely proportional to phosphor efficiency and with identical gating tubes identically biased and supplied by gating signals of equal amplitude, the color-deflection amplitude giving the correct dwell on the green will also give the correct dwell on the red and blue emitting phosphors.

It will be seen that, in effect, the gating tubes are modulators, modulating upon the keying pulses the instantaneous value of the television signal. Since the process is a modulation, the amplitude of the resulting pulses is proportional to the product of the keying and modulating potentials. If the dwell of the scanning spot on each phosphor is uniform, when integrated over the cycle, the amplitude of the keying pulses should also be uniform, but if, because of various factors in engineering design it becomes impractical to make the dwell upon the green or central phosphor equal to that upon the red and blue, this can be compensated by making the amplitude of the double-frequency keying pulses greater or smaller. To do so, and therefore maintain the same cut-off point, also requires an increase or decrease in the bias on the electrode 70. By varying these factors it is possible to get an accurate balance of the various component colors to produce a white light and to maintain this balance throughout the surface of the screen.

It is to be understood that while the invention has been described with a particular type of gate and a specific relation between the red, green, and blue emitting phosphors, these are not the essential factors in the invention. The green phosphor is given its central position for reasons not directly connected with the present invention, but because the green possesses the higher luminance and is therefore best adapted for the presentation of detail. There are, in certain instances, advantages in making the red phosphor the one which is electro-optically alined with the center of the apertures, in which case, of course, it would be the red gate which would be keyed by the double frequency wave.

Many other gating circuits are available for the designer; "Waveforms," vol. 19, Radiation Laboratories Series (McGraw-Hill, 1949), devotes chapter 10, page 364 et seq., to circuits adapted for this purpose, and many of these are adapted for the purposes of this invention. If it is desired, the beam intensity may be controlled from the grid of the cathode-ray tube instead of from the cathode, in which case, of course, the polarity of the gated color signals would be reversed. It is obvious that the apparent intensity of the color signals may be controlled by varying the duration of the pulses as well as by their amplitude, this having been touched upon indirectly in what has already been stated. It is not intended that the invention be limited to the exact form herein disclosed, all limitations being expressed in the following claims.

What is claimed is as follows:

1. In television apparatus including; a cathode-ray tube for displaying television images in natural color which includes an electron gun, a display screen against which electrons from said gun are directed and comprising a base having deposited thereon strips of phosphors respectively emissive of light of different component colors additive to produce white light, said strips being disposed in a cyclicly repeating pattern of groups emissive of light of all of said component colors, and a color-control grid mounted adjacent and substantially parallel to said display screen and comprising two interleaved and mutually insulated sets of elongated linear electrodes, extending generally parallel to the direction of said strips and with all of the electrodes of one set electro-optically centered, as viewed from said gun in front of strips emissive of one color and the electrodes of the other set so centered in front of strips emissive of a different color, a circuit for applying color determining voltages to said tube at a designed repetition frequency consisting of an inductor connected between said sets of electrodes and resonant therewith to said frequency, and leads for applying across said inductor and electrodes an oscillating voltage of said frequency.

2. In television apparatus including; a cathode-ray tube for displaying television images in natural color which includes an electron gun, a display screen against which electrons from said gun are directed and comprising a base having deposited thereon strips of phosphors respectively emissive of light of three different component colors designated respectively as A, B, and C which additively produce white light arranged in a cyclicly repeating pattern in the order A, B, C, B, A, etc., and a color-control grid mounted adjacent and substantially parallel to said display screen and comprising two interleaved and mutually insulated sets of elongated linear electrodes extending generally parallel to the direction of said strips and with all of the electrodes of one set electro-optically centered, as viewed from said gun, in front of strips emissive of the color A and the electrodes of the other set so centered in front of strip emissive of the color C, a circuit for applying color determining voltages to said tube at a designed repetition frequency consisting of an inductor connected between said sets of electrodes and resonant therewith to said frequency, and leads for applying to across said inductor and electrodes an oscillating voltage of said frequency.

3. In combination with a cathode-ray tube for displaying television images in color which includes an electron gun having electrodes controlling the intensity of an electron beam produced thereby, a color-control grid comprising two mutually insulated interleaved sets of elongated linear conductors and a display screen adjacent to said grid and having deposited thereon strips of phosphors emissive on electron impact of light of three different component colors additively producing white, a strip of one of said phosphors being electro-optically centered behind each electrode of one of said sets as viewed from said gun, a strip of another of said phosphors being so centered behind each of the electrodes of the other of said sets, and a strip of the third of said phosphors being disposed between each pair of strips of the other two phosphors, an inductor connected between said two sets of electrodes to form a resonant circuit, a source of electrical oscillations of substantially the frequency to which said inductor and the interelectrode capacity of said sets of electrodes are resonant, a group of three gating circuits each including terminals for two input circuits and one output circuit, connections from all of said output circuit terminals to the beam-controlling electrodes of said electron gun, connections for applying said oscillations to said resonant circuit, connections for applying said oscillations in opposite phases to the terminals for one input circuit of each of two of said gating circuits, frequency-doubler means connected for excitation by said oscillations, and connections from said frequency-doubling means to the terminals for one input circuit of the third gating circuit.

4. In combination; a cathode-ray tube for displaying television images in natural color which includes an electron gun, a display screen against which electrons from said gun are directed and comprising a base having deposited thereon strips of phosphors respectively emissive of light of different component colors additive to produce white light, said strips being disposed in a cyclicly repeating pattern of groups emissive of light of all of said component colors, and a color-control grid mounted adjacent and substantially parallel to said display screen and comprising two interleaved and mutually insulated sets of elongated linear electrodes, extending generally parallel to the direction of said strips and with all of the electrodes of one set electro-optically centered, as viewed from said gun, in front of strips emissive of one color and the electrodes of the other set so centered in front of strips emissive of a different color, an inductor connected between said sets of electrodes, means for applying across said inductor an oscillating voltage of the frequency to which the circuit comprising said inductor and electrode sets is resonant, and means for interrupting the beam of electrons produced by said gun at each epoch in each cycle of said oscillating voltage wherein a beam in passing through the field produced thereby between adjacent electrodes of said sets would in part impact simultaneously two of said phosphor strips.

5. In combination; a cathode-ray tube for displaying television images in natural color which includes an electron gun, a display screen against which electrons from said gun are directed and comprising a base having deposited thereon strips of phosphors respectively emissive of light of three different component colors designated respectively as A, B, and C which additively produce white light arranged in a cyclicly repeating pattern in the order A, B, C, B, A, etc., and a color-control grid mounted adjacent and substantially parallel to said display screen and comprising two interleaved and mutually insulated sets of elongated linear electrodes extending generally parallel to the direction of said strips and with all of the electrodes of one set electro-optically centered, as viewed from said gun, in front of strips emissive of the color A and the electrodes of the other set so centered in front of strip emissive of the color C, an inductor connected between said sets of electrodes, means for applying across said inductor voltage oscillations of the frequency to which the circuit comprising said inductor and electrode sets is resonant, and means for interrupting the beam of electrons from said gun in each cycle of such oscillations substantially 30 electrical degrees on each side of the nodes thereof.

6. In television apparatus including; a cathode-ray tube for displaying television images in natural color which includes an electron gun, a display screen against which electrons from said gun are directed and comprising a base having deposited thereon strips of phosphors respectively emissive of light of three different component colors designated respectively as A, B, and C which additively produce white light arranged in a cyclicly repeating pattern in the order A, B, C, B, A, etc., and a color-control grid mounted adjacent and substantially parallel to said display screen and comprising two interleaved and mutually insulated sets of elongated linear electrodes extending generally parallel to the direction of said strips and with all of the electrodes of one set electro-optically centered, as viewed from said gun, in front of strips emissive of the color A and the electrodes of the other set so centered in front of strip emissive of the color C, a circuit for applying color determining voltages to said tube at a designed repetition frequency consisting of an inductor connected between said sets of electrodes and resonant therewith to said frequency, means for applying across said inductor voltage oscillations of said frequency.

References Cited in the file of this patent

UNITED STATES PATENTS

| | | |
|---|---|---|
| 2,185,135 | Schlesinger | Dec. 26, 1939 |
| 2,446,791 | Schroeder | Aug. 10, 1948 |
| 2,568,448 | Hansen | Sept. 18, 1951 |

OTHER REFERENCES

IRE publication July 1953, pages 851–858; article by Robert Dressler, "The Pdf Chromatron—A Single or Multi-gun Tri-color Cathode Ray Tube."

Disclaimer 2,721,293.—*James D. Gow*, Berkeley, Calif. CONTROL CIRCUIT FOR COLOR TELEVISION DISPLAY TUBES. Patent dated Oct. 18, 1955. Disclaimer filed Apr. 9, 1957, by the inventor; the assignee, *Chromatic Television Laboratories, Inc.*, assenting.

Hereby enters this disclaimer to claim 3 of said patent.

[*Official Gazette May 7, 1957.*]

Disclaimer 2,721,293.—*James D. Gow*, Berkeley, Calif. CONTROL CIRCUIT FOR COLOR TELEVISION DISPLAY TUBES. Patent dated Oct. 18, 1955. Disclaimer filed Jan. 7, 1959, by the inventor; the assignee, *Chromatic Television Laboratories, Inc.*, assenting.

Hereby enters this disclaimer to claims 1, 2, and 6 of said patent.

[*Official Gazette March 3, 1959.*]